UNITED STATES PATENT OFFICE 2,456,558

PROCESS FOR THE POLYMERIZATION OF STYRENE AND RELATED COMPOUNDS

Sanford E. Glick, Springfield, Mass., assignor to Monsanto Chemical Company, St. Louis, Mo., a corporation of Delaware No Drawing. Application October 25, 1944, Serial No. 560,341

3 Claims. (Cl. 260—91)

This invention is directed to an improved method for polymerizing and copolymerizing vinyl aromatic compounds. More specifically the invention is directed to a method for mass polymerization of styrene by which the polymerization time is drastically shortened and a polymer of improved flexibility is obtained.

Prior methods for the mass polymerization of styrene have required 5 to 35 days for the completion of the polymerization process when high molecular weight polymers are desired and have often required further working to remove residual monomer.

It is an object of this invention to provide an improved method for the mass polymerization of styrene.

A further object of this invention is to provide a relatively rapid method for the mass polymerization of styrene.

Another object of this invention is to provide a method for the mass polymerization of styrene which yields a product of improved flexural properties.

These and other objects are attained by polymerizing the styrene monomer in a low temperature zone to produce relatively long molecular chains, then gradually raising the temperature to an intermediate zone over an extended period of time, continuing the polymerization in the intermediate temperature zone to nearly complete the reaction, and finally completing the polymerization in a high temperature zone.

The following example is in illustration of the process of this invention but is not limitative thereof.

Example I

Styrene monomer was placed in a suitable mold such as a glass cylinder. It was then polymerized at about 90° C. for 14 hours after which the temperature was raised gradually to about 125° C. over a period of 24 hours. The polymerization was continued at about 125° C. for 10 hours and completed during 24 hours at about 177° C. The polymer was then ground and injection molded into a ¼" x ¼" bar which had a deflection of .150" over a 2" span as measured by A. S. T. M. method #D650-42T.

As an example of the prior processes styrene monomer was polymerized at 106° C. for 96 hours and at 175° C. for 24 hours. The flexural strength of a ¼" x ¼" bar over a 2" span measured by the same method was .129".

It will be seen from a comparison of the two processes, that the new process has cut the polymerization time by 40% and has yielded a product having over 16% improved flexural deflection.

The temperatures of each step of the process of this invention may be varied over about a 20 to 30 degree range as, for example, the first polymerization stage may be conducted at about 80 to 110° C., the second polymerization stage may be at about 120 to 140° C. and the final polymerization may be carried out at about 165 to 185° C.

The duration of each successive step may be varied by from about 5 to 10 hours. For example, the first step may be carried out for from about 10 to 16 hours, the gradual rise in temperature may last over a period of about 10 to 30 hours, the intermediate polymerization step may last about 10 to 16 hours and the completion of the polymerization may be carried out over a period of about 10 to 30 hours. One of the more essential parts of the invention is the gradual raising of the temperature between the first and second polymerization steps which should be conducted over an extended period of time as noted, e. g., about 10-30 hours and preferably about 20 to 30 hours. If the gradual rise in temperature is eliminated the desired improvement in the flexural strength of the product is not attained and the saving in time is not worthwhile.

The polymerized product obtained by the method of this invention contains less than 3% of unpolymerized monomer and low molecular weight polymer in contrast to prior processes in which 7 to 10% of monomer or low molecular weight polymer remains in the product and which must be at least partially removed by a laborious process to stabilize the polymeric product. In proportions of less than 3%, the presence of monomers and low molecular weight polymers does not substantially lower the stability of the product.

Other vinyl aromatic compounds may be advantageously polymerized by the process of this invention, such as, for example, the homologs of styrene such as paramethyl or paraethyl styrene, and derivatives of styrene such as the mono and poly halides of styrene including ortho, meta or para chloro styrene, 2,5-dichloro styrene and 3,4-dichloro styrene, vinyl diphenyl, vinyl naphthalene, divinyl benzene and so forth. Copolymers may also be prepared by polymerizing mixtures of the above mentioned vinyl aromatic compound by the methods of this invention.

It is to be understood that the description of this invention is illustrative thereof and that variations may be made within the scope of the invention as defined in the appended claims.

What is claimed:

1. A process for the mass polymerization of aromatic vinyl compounds taken from the group consisting of styrene, para methyl styrene, para ethyl styrene, ortho chlorostyrene, meta chlorostyrene, para chlorostyrene, 2,5-dicholorostyrene, 3,4-dichlorostyrene, vinyl diphenyl and vinyl naphthalene in the absence of polymerization catalysts which comprises initiating polymerization by heating the mass at 80° C. to 110° C. for 10 to 16 hours, thereafter gradually raising the temperature of the mass to 120° C. to 140° C. during a period of 20 to 30 hours, continuing the polymerization at 120° C. to 140° C. for 10 to 16 hours and completing the polymerization at 165° C. to 185° C. for 10 to 30 hours.

2. A process as in claim 1 wherein the aromatic vinyl compound is styrene.

3. A process for the mass polymerization of styrene in the absence of polymerization catalysts which comprises initiating the polymerization at 90° C. for 14 hours, thereafter gradually raising the temperature of the mass to 125° C. over a period of 24 hours, continuing the polymerization at 125° C. for 10 hours and completing the polymerization by heating at 177° C. for 24 hours.

SANFORD E. GLICK.

REFERENCES CITED

The following references are of record in the file of this patent:

UNITED STATES PATENTS

| Number | Name | Date |
| --- | --- | --- |
| 2,077,542 | Wulff | Apr. 20, 1937 |
| 2,255,729 | Britton | Sept. 9, 1941 |
| 2,270,182 | Collings | Jan. 13, 1942 |
| 2,270,184 | Driesbach | Jan. 13, 1942 |
| 2,273,822 | Allen | Feb. 24, 1942 |
| 2,331,273 | Lowry | Oct. 5, 1943 |
| 2,394,407 | Soday | Feb. 5, 1946 |

OTHER REFERENCES

Stanley Chem. & Ind., Jan. 29, 1938, pp. 93-98.
Brajnikoff Plastics, (London) July, 1942, pp. 230-238.